United States Patent
Chintakayala et al.

(10) Patent No.: US 10,216,816 B2
(45) Date of Patent: *Feb. 26, 2019

(54) SHIPPING OF DATA THOUGH ETL STAGES

(71) Applicant: INTERNATIONAL BUSINESS MACHINES CORPORATION, Armonk, NY (US)

(72) Inventors: Kalyanji Chintakayala, Hyderabad (IN); Krishna K. Bonagiri, Ambajipet (IN); Eric A. Jacobson, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,450

(22) Filed: May 23, 2018

(65) Prior Publication Data

US 2018/0260457 A1    Sep. 13, 2018

Related U.S. Application Data

(63) Continuation of application No. 15/664,951, filed on Jul. 31, 2017, now Pat. No. 9,984,135, which is a continuation of application No. 15/190,223, filed on Jun. 23, 2016.

(51) Int. Cl.
  *G06F 17/30* (2006.01)
  *H04L 29/06* (2006.01)

(52) U.S. Cl.
  CPC .. *G06F 17/30563* (2013.01); *G06F 17/30315* (2013.01); *H04L 63/06* (2013.01)

(58) Field of Classification Search
  None
  See application file for complete search history.

(56) References Cited

U.S. PATENT DOCUMENTS

| | | | |
|---|---|---|---|
| 8,099,725 B2 | 1/2012 | Jin | |
| 9,143,161 B1 | 9/2015 | Greene | |
| 9,294,122 B2 | 3/2016 | Greene | |
| 9,984,135 B2 | 5/2018 | Chintakayala | |
| 2006/0117238 A1* | 6/2006 | DeVries | G06F 19/36 714/746 |
| 2008/0168082 A1 | 7/2008 | Jin | |
| 2012/0154405 A1 | 6/2012 | Baumgartner | |

(Continued)

OTHER PUBLICATIONS

Woodall et al., "A Framework for Detecting Unnecessary Industrial Data in ETL Processes," 2014 12th IEEE International Conference on Industrial Informatics (INDIN), Jul. 27-30, 2014, p. 472-476, IEEE.

(Continued)

*Primary Examiner* — Son T Hoang
(74) *Attorney, Agent, or Firm* — Robert C. Bunker

(57) ABSTRACT

Performing an extract, transform, and load (ETL) process. Column data is received by a stage of the ETL process. The size of the received column data is ascertained by the stage. In response to determining that the size of the column data exceeds a predefined threshold, the stage saves the column data and creates a data locator associated with the column data. The created data locator advances through successive downstream stages of the ETL process as a replacement for the column data.

1 Claim, 5 Drawing Sheets

(56) References Cited

U.S. PATENT DOCUMENTS

| | | |
|---|---|---|
| 2012/0155459 A1* | 6/2012 | Bouthemy .............. H04L 51/04 |
| | | 370/389 |
| 2013/0073515 A1 | 3/2013 | Bhide et al. |
| 2013/0325788 A1 | 12/2013 | Brown |
| 2014/0368849 A1* | 12/2014 | Kato .................. H04N 1/00278 |
| | | 358/1.13 |
| 2015/0052157 A1 | 2/2015 | Thompson |
| 2017/0371939 A1 | 12/2017 | Chintakayala |
| 2017/0371940 A1 | 12/2017 | Chintakayala |
| 2018/0260456 A1 | 9/2018 | Chintakayala |

OTHER PUBLICATIONS

IBM, "List of IBM Patents or Patent Applications Treated as Related (Appendix P)," Oct. 5, 2018, p. 1-2.

* cited by examiner

SHIPPING OF DATA THOUGH ETL STAGES

BACKGROUND

The present invention relates generally to the field of data warehousing, and more particularly to shipping of data during an extract, transform, and load (ETL) operation, specifically selective shipping of data directly to a stage that requires the data, by bypassing intermediary stages.

Data warehouses typically populate data through a process known as an extract, transform, and load (ETL). An ETL job is a sequence of processes called stages. Each of the stages processes records in a database that may contain multiple columns of data. Data records at a stage are typically received from the previous stage, called the upstream stage. After processing the column data, each stage passes the processed column data to the next stage, called the downstream stage. ETL operations thus require high-speed data movement through several stages for completion of the process. There can be several processes under ETL operations, such as merging data from various sources, cleaning data, copying data, transformation of data, quality validation of data, optimization of data, management of master data, management of metadata, etc. Each of these processes may further include sub-processes, for example, summary, aggregation, filtering, and splitting from one resource to multiple destinations, or vice versa.

During an ETL operation, or process, data undergoes various transformations. Broadly, the extract phase is a process for receiving data from various sources. The extracted source data is typically stored as one or more relational database tables. The transform phase in the ETL process is typically made up of several stages and includes converting data formats and merging extracted source data to create data in a format suitable for the target data repository. The load phase of the ETL process includes depositing the transformed data into the target data data repository. When the data repository is a relational database, the load process is often accomplished with structure query language (SQL) commands or other SQL tools. Thus, the ETL operation requires manipulation of column data via a sequence of stages/processes/steps. As data has to be transmitted, or shipped, through each of the intermediate stages, and several processes are involved in the completion of the operation, ETL processes may be very time consuming.

As a result of the requirement to transmit data through each of several successive ETL stages and, until data processing at each of the successive stages is complete, analysis of the data to support decisions cannot take place. Therefore, a system which may significantly reduce the time required for ETL operations to complete would be advantageous.

There is need for a solution that can resolve the problem of delay caused by transmitting data through each of the successive ETL stages, until the data is required at the stage/process receiving the data. It would be desirable to resolve the problem of delay by providing a solution whereby data is transmitted directly to the stage that actually needs to utilize the data.

SUMMARY

Embodiments of the present invention disclose a computer-implemented method, computer program product, and system for performing an extract, transform, and load (ETL) process. Column data is received by a stage of the ETL process. The size of the received column data is ascertained by the stage. In response to determining that the size of the column data exceeds a predefined threshold, the stage saves the column data and creates a data locator associated with the column data. The created data locator advances through successive downstream stages of the ETL process as a replacement for the column data.

To the accomplishment of the foregoing and related ends, the following description and accompanying drawings set forth certain illustrative aspects and implementations. These are indicative of but a few of the various ways in which one or more aspects may be employed. Other aspects, advantages, and novel features of the disclosure will become apparent from the following detailed description when considered in conjunction with the accompanying drawings.

BRIEF DESCRIPTION OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure. The various features of the drawings are illustrations for clarity and are not to scale.

DETAILED DESCRIPTION

Figure 1:
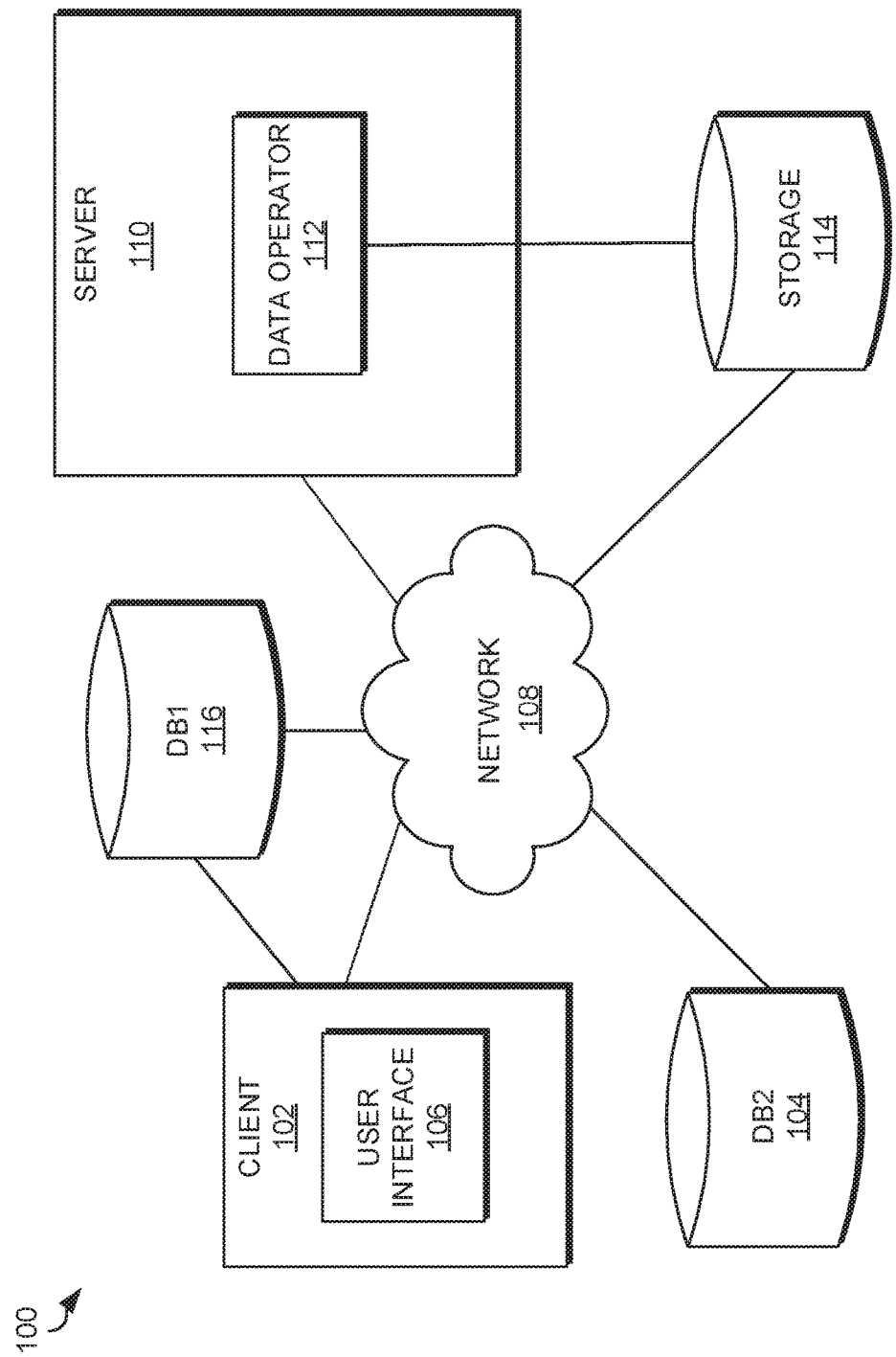
FIG. 1 illustrates an exemplary schematic structural diagram of an environment for an extract, transform, and load (ETL) operation, in accordance with an embodiment of the present invention.

As used herein, large object byte (LOB) refers to a data type in a data warehouse typically used to store large amounts of data, data whose size is greater than a specified, configurable parameter. This parameter may vary depending upon the infrastructure of the data warehouse. LOB column data is often used for data migration and data storage. LOBs may include large blocks of character data or unstructured data such as video clips. For example, LOBs can be system files operating outside database table spaces, or stored in source database table spaces.

During an extract, transform, and load (ETL) operation where the size of the object data is small, transmitting data across successive stages may not pose a serious problem. However, when the object data is identified as being large object byte (LOB) data, and LOB data is required to be transmitted through various stages of the ETL operation, excessive time may be expended in transferring data for completion of the stages, making the overall process slow. In such cases, completion of the ETL operation may take more than the usual amount of time. To avoid delays due to transmission of LOB data in such situations, if the size of the object data is determined beforehand, it may be possible to reduce the time required for the ETL operation to complete. A mechanism is described that can enable direct transmission of LOB data to the stage that requires the data.

The present invention describes a cost-saving method for shipping column data on demand. In various embodiments, a system is configured that can reduce the time required for data transmission by bypassing LOB data movement through several stages of an ETL operation. There is provided a mechanism that can enable LOB type column data to be transmitted directly to a stage where actual processing of the LOB data is required, from a source where latest data is available. In one embodiment, passage of the LOB column data through stages where the transmitted column data is not required by the succeeding stage is skipped.

The present invention provides a solution that may be more beneficial than just transmitting compressed data, given that compressed data transmission may need additional processing time to complete an evaluation process required to move the data through successive stages, irrespective of the data requirement of the stages.

The described mechanism provides for determining the size of column data, and when the size of the column data being transmitted is very large, a data locator is created. The mechanism provides for replacing the column data with data locator, which is then retransmitted through successive stages until the column data is required by a subsequent stage. Further, the column data is saved by the stage that creates data locator, instead of either sending the column data back to the source or moving the column data forward. The solution further enables a stage that requires the column data to get the column data directly from the stage which has a latest version of it.

During an ETL operation, the extraction process requires the transmission of data from one or many different sources, either by connecting directly to the source system or by accessing data staged outside the source system.

During the extraction process, identified data is physically transported from various sources for further processing by moving data from one stage of the ETL operation to another stage. Based on the type of output desired, data processing may require transmission of data through several stages, each stage performing a distinct process/manipulation.

After the data is transformed in the transform phase, transformed data is new data, which may be physically inserted as clean data into the target database during the load phase. This step may further require building indexes, validating constraints, and/or making backups to make this new data available to end users. Once this data has been loaded into the database, materialized views may be updated to reflect the latest data.

In order to perform the ETL operation, some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Embodiments of the present invention will now be described in detail with reference to FIGS. 1-5. The present invention describes a system that performs an ETL operation. The system provides a solution that enables selective physical transmission of column data on demand to a stage that requires the column data. The system enables creating a data locator, which is a data structure having a specific metadata design, to house information associated with the column data it will replace. The system enables creation of the data locator by the stage which has read or modified the column data. The system enables the replaced column data to be saved by the stage that created the data locator. The system enables the created data locator to be transmitted through several successive stages until the data locator reaches a stage that requires the saved data associated with the created data locator. The stage may process the metadata stored in the data locator and utilize this information to request from the stage storing the latest version of the column data to transmit the saved column data to the requesting stage, by bypassing intermediate stages.

FIG. 1 is a functional block diagram illustrating an environment for data processing during an ETL operation, in accordance with an embodiment of the present invention. Environment 100 includes a server 110, a client 102, source databases 104, 116 and a target database 114, all interconnected via a network 108.

FIG. 1 illustrates a client 102. Client 102 enables a user to send a request to server 110. The request may be input from client 102 to server 110 to load data stored on one or more of the source databases 104, 116 and save it on a target database 114. In one embodiment, client 102 includes a user interface (UI) 106 which operates to receive user input from the user via the provided UI 106, thereby enabling the user to interact with client 102. In one embodiment, the UI 106 provides an interface that enables the user of client 102 to interact with server 110 via the network 108.

In one embodiment, client 102 may include a client application (not shown) to communicate with server 110. In some embodiments, the client application intermediates through server 110 to communicate with the one or more source databases 104, 116. In various embodiments, UI 106 may be a part of a client application. The client application may request user input through UI 106, to request and receive desired data from server 110, and then present the received data using the display capabilities of client 102 and/or client application (for example, using graphics or spreadsheets). An output may be communicated in the form of HTML, CSS, and/or JavaScript, or a variety of user interface technologies. In one example, the output may be stored as an XML file or .txt (text) file or a pivot table. In another example, the output may be a cube model, on which data analysis can be performed.

In various embodiments, client 102 can be a laptop computer, a tablet computer, a netbook computer, a personal computer (PC), a desktop computer, a personal digital assistant (PDA), a smart phone, or any programmable electronic device capable of communicating with server 110 via network 108, in accordance with an embodiment of the invention. Client 102 may include internal and external hardware components, as depicted and described in further detail with respect to FIG. 5.

The request from client 102 is received and processed by server 110. In various embodiments, server 110 is a device that can be a standalone device, a server, a laptop computer, a tablet computer, a netbook computer, a personal computer (PC), or a desktop computer. In another embodiment, server 110 represents a computing system utilizing clustered computers and components to act as a single pool of seamless resources. In general, server 110 can be any computing device or combination of computing devices with access to client 102 and source databases 104, 116, and with access to and/or capable of being communicatively linked to them over the network 108 (e.g., the internet), allowing processing of data located at several locations. Server 110 may include internal and external hardware components, as depicted and described in further detail with respect to FIG. 5.

In an embodiment, server 110, in order to process the request, identifies the data required for processing the request. Based upon processing, server 110 communicates with one or more of the source databases 104, 116. In FIG. 1, while two source databases 104, 116, from which data can be collected or retrieved, are indicated, there can be more such source databases (not shown) from which data can be extracted. In one embodiment, source databases 104, 116 may store data as column data. For example, there may be database files containing table data, indexes, etc., which are to be transported. In another example, source databases 104, 116 may include flat files, XML, text or EDI files required for data loading. Furthermore, metadata can be also transported in addition to transporting data.

In one embodiment, the user may through UI 106 make a selection of the inputs/information required from source databases 104, 116, respectively. Server 110 can enable a display on the UI 106 of how many rows are missing or contain invalid values, what is the distribution of the values in the specific column, etc. Based on this knowledge, the user can specify rules to clean or update the data. In another example, the data from source databases 104, 116 can be directly used by server 110 to perform the steps involved in the ETL operation.

Once the data is processed by server 110, the clean data may be stored in a target database 114. The target database 114 is a data repository from which the stored data is read for doing data analysis. In one example, the ETL process may require metadata management.

Information about all the data that is processed, from source to target database by transformations, is often put in a directory called a metadata repository (not shown), which may be part of the target database 114. The target database 114 may include the metadata repository to maintain information on data lineage, integrity, and history.

In some embodiments, the target database 114 can be read by server 110 and client 102. In some embodiments, the target database 114 can be read by programs and entities inside and/or outside of the environment 100 in order to populate the repository with new data.

In some embodiments, the target database 114 may be stored on disk storage or in one or more accessible memory locations. When speed is a key performance metric, the target database 114 may be stored in memory, while other portions of the database may be stored on disk storage. In some embodiments, the target database 114 may have storage across multiple locations in a single server or distributed across several servers. In one example, the target database 114 may be part of server 110 or may be located in a cloud. The target database 114 may store physical data in one or more different formats. In one example, the target database 114 can function as either source or/and target database at the same time.

Network 108 can be, a local area network (LAN), a wide area network (WAN) such as the internet, or a combination of the two, and may include wired, wireless, fiber optic or any other connection known in the art. In general, the network 108 can be any combination of connections and protocols that will support communications between server 110, client 102, source databases 104, 116, and the target database 114, in accordance with a desired embodiment of the present invention.

As indicated in FIG. 1, server 110 includes data operator 112. Data operator 112 can be a business intelligence tool that performs the ETL operation. In another embodiment, data operator 112 can be an engine that performs various extraction, transformation, or loading functions during the ETL operation, independent of other server processes. In one embodiment, data operator 112 may be an application layer used to operate and manage the ETL operation. In one example, as a dedicated application running in server 110, data operator 112 may be able to natively read the data from source databases 104, 116 and also communicate with client 102. In another embodiment, data operator 112 may be a component serving on server 110. In yet another embodiment, data operator 112 may be an independent tool located outside of server 110 and communicatively coupled with server 110 to perform the ETL operation based on the instructions received from server 110. In one example embodiment, data operator 112 may be another server communicating with server 110. In some embodiments, data operator 112 is an application that may run on client 102. In one embodiment, data operator 112 may be configured to communicate with the user through UI 106.

During the ETL operation, data operator 112 may be configured to enable extraction of data from source databases 104, 116 and then load the transformed data into the target database 114. Data operator 112 may perform the ETL operation in a staging area (not shown) where the data can be transformed, corrected, and prepared for doing data analysis. Data operator 112 may perform each of the ETL processes at one or more of the stages as depicted and explained in further detail with reference to FIGS. 2 and 3. Terms such as stage, stages or staging area may be used interchangeably.

Once a communication in the form of a database query is input from the client device 102 or server 110 and is received by data operator 112, data operator 112 may parse the query and translate it into a job which is executed either by data operator 112 or on server 110. Data operator 112 may be configured to capture the data from source databases 104, 116 and then process it, before loading it into target database 114, based on transformations conducted in response to the query.

In one embodiment, metadata of the data processed may be stored, as part of information associated with the query, on the target database 114. In one example, metadata may include a key to be associated with the query. Data operator 112 generates the key that may function as a common key corresponding to the data and the input query. The key may be generated during the execution of the query command. The key may be further mapped to corresponding data in the target database 114 to track and fetch data.

In the present invention, transmission of column data is described as an example, and not a limitation. Data operator 112 may be configured to move the column data through various stages. Data operator 112 may be configured to manipulate the column data being transmitted from one stage to another, whenever desirable. In some embodiments where the query requires transmission of LOB column data, data operator 112 may be configured to defer the actual movement of bits of the column data into various stages. In some embodiments, data operator 112 may be configured to enable the stage processing an operation to manipulate the LOB column data at the stage itself. In another example, data operator 112 may be configured to specify exactly to the stage which manipulations it is to perform on the received column data.

The stage may perform functions such as reading the data and using the column data without modifying it, or reading and modifying the column data, or not using the data at all and passing it along to the downstream stage.

Figure 2:
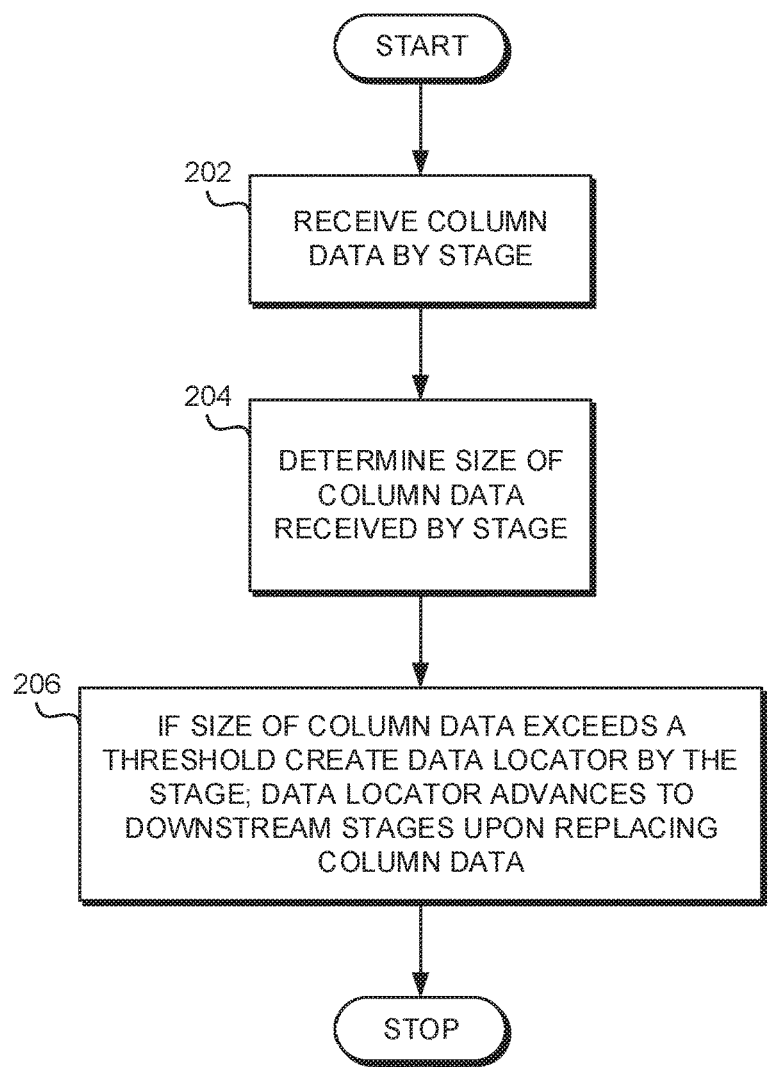
FIG. 2 illustrates an exemplary schematic flowchart depicting various steps of a method for creation of a data locator during the execution of an ETL operation, in accordance with an embodiment of the present invention.

Data operator 112 may be configured to execute various process steps, as depicted in FIG. 2.

FIG. 2 is a flowchart 200 depicting various operational steps of an ETL operation, on a computing device in the environment 100 of FIG. 1, in accordance with an embodiment of the present invention. In one embodiment, the method provides for selective transmission of data directly to the stage that requires the data for data reading, or data writing, or data manipulation by bypassing transmission of data through each intermediate stage that may not need to receive the column data for any such action.

The method comprises the following steps: At step 202 a stage receives column data. At step 204, the size of the column data received by the stage is ascertained, and at step 206, in response to a determination that the size of the received column data exceeds a predefined threshold, a data locator is created by the stage, and the created data locator advances through to downstream stages upon replacing the column data.

At step 202 column data is received by a stage. The stage performs at least one of the processes required during the execution of the ETL operation. Each stage implements a particular operational logic to perform an action. There can be several staging areas, or processes, performing one or more operational logics, depending on the input query. During the ETL operation, data undergoes manipulations, or transformations, in various staging areas, before outputted data is ready for analysis based on the input query. Each of the stages may hold intermediate results when data is pipelined through several processes. In some embodiments, the staging area can be located either in data operator 112 or on server 110.

The storage within the stages during the ETL process is designed with a goal of minimizing contention with source databases. For example, copying required data from source databases to the staging area in one shot is often more efficient than retrieving individual records (or small sets of records) on a one-off basis. The logic behind storing the intermediary transformed data in the staging area is that data operator 112 can recover data easily from the stage that performed the manipulations, instead of going again to the server to retrieve the latest version of the data undergoing transformations. Storing the manipulated data consolidated from multiple source databases in the staging area temporarily for further processing of data provides more efficiency. The decision to store data in a physical staging area versus processing it in memory is ultimately the choice of data operator 112.

A staging area may include metadata, for example keys of the data held on the source or the target, and can be used to detect whether incoming data includes new or updated data rows/columns. In one example, the stage may itself tag actual received data (i.e., column data) with additional metadata indicating the source of origin and timestamps indicating when the data was placed in the staging area. In some examples, the staging area may include a repository for historical data, if not truncated.

In some embodiments, various processes at stages of the ETL operation are performed by data operator 112. Data operator 112 may create the staging area configured to provide space to hold temporary tables. Data operator 112 may be configured to delete the data stored as temporary data in the staging area. The staging activity is explained in further detail in reference to FIG. 3.

At Step 204, the size of the column data received at a stage is determined. In one example, columns of data may be transmitted successively. At other times, there may be collective transmission of column data. The size of the column data to be transmitted from one stage to another stage can vary depending upon the operation requirements. The size of the column data received at the stage is ascertained in order to determine whether the column data may be moved to the next stage. The size of the column data may vary depending upon the infrastructure capabilities of the system being used during the ETL operation. The size of the column data can be computed using standard techniques. In one example, the size of the column data may be established based on the inputs in the query during the ETL operation. In one embodiment, the size of the received column data is ascertained by data operator 112. In another example, the stage receiving the column data is capable of determining the size of the received column data.

The determination of the column data size is required in order to know whether the operation may cause performance issues due to the transmission of large data sets. In one embodiment, the size of the column data to be moved from one stage to another is compared to a predefined threshold. The threshold determination can vary depending upon the infrastructure of the ETL tools executing the ETL operation. The threshold may be predefined either manually or automatically.

In one embodiment, when the size of the column data does not exceed the threshold, the stage provides for column data transmission across several stages for undergoing transformations.

When the size of the column data being transmitted exceeds the threshold, it is considered an oversized LOB transmission. There may be performance issues during the ETL operation when oversized LOB data is required to be transmitted across several stages.

The stage from which the column data is transmitted to the next stage is referred to as the upstream stage for the next stage. Likewise, the stage receiving the column data from the upstream stage is called the downstream stage.

At step 206, in response to a determination that the size of the received column data exceeds a threshold, a data locator is created by the stage, and the created data locator advances through to downstream stages upon replacing the column data.

In some embodiments, when it is determined that the size of the column data exceeds a predetermined threshold, the column data to be transmitted is replaced with a data locator. In some embodiments, the stage that first reads the column data determines whether the received column data is oversized. In response to this determination, the stage is responsible for creating a data locator in parallel for the received column data. In some embodiments, the stage that first reads oversized column data from an external source such as a database or files is also capable of creating a data locator.

A data locator is a data structure thread created to replace oversized LOB column data. The data locator may enable consistent reading of the associated column data that it replaces. The stage that determines that the column data is oversized returns a data locator thread to replace the associated column data. The data locator is configured to contain information about how to get the associated column data. The stage which created the data locator, since it is not sending the column data downstream, will pass down details about the replaced column data via the created data locator to subsequent stages.

In some embodiments, a process that runs the stage is configured to create a data locator. The process that runs the stage can spawn several threads at one point in time, each thread being capable of sharing the same memory as that of the stage. Further, each thread may be configured to establish a link with one another through the same common key. Any updating in the metadata of one thread can be automatically revised for the other threads sharing the same memory. The stage creating the data locator need not know which particular next process/stage/step will utilize the information contained in the data locator.

In some embodiments, the column data is saved at the stage creating the data locator. The column data is saved at the stage to reduce the read or write of the column data by the server. This may enable better performance and save disk space.

In some embodiments, data operator 112 may enable transmission of the created data locator through successive stages by pausing the moving of the column data. Data operator 112 may enable the continuous advancing of the data locator through subsequent downstream stages until the column data is required by a downstream stage to manipulate the contents associated with the column data. Manipulation implies writing, or overwriting, or deleting, the existing contents of the saved column data.

In other words, the same data locator may span several successive stages of processing until the corresponding column data is required at a subsequent stage. In some implementations, the replaced column data is supplied on demand to the stage which requires the associated column data. On demand implies that the data is either required to be read or modified by the stage. The present invention provides for directly transferring column data to a stage that requires it.

A data locator may include a variable. The variable in a data locator represents a constant value. The variable in the data locator can be utilized by data operator 112 and/or the stage to identify the associated data locator. The data locator's variable may be further required to point to the actual column data being replaced. In one embodiment, the data locator's variable is associated with the data column contents as an identification. Data operator 112 and/or the stage may utilize the variable of the data locator to retrieve the associated column data. The size of a typical data locator can be less than a kilobyte, in contrast to compressed data, which may exceed a megabyte in size.

In some embodiments, the data locator additionally includes metadata. In one example, the variable may include a hash key. The hash key in a data locator may point to the common key generated during the database query. The hash key may include an index, which may be utilized to build the association with the column data for which the data locator is created. The data locator may include an address such as host name, port name etc., where the corresponding column data is located. The data locator may have information about how the corresponding column data can be made available to the stage which needs the data. The data locator may further include information on the stage saving the associated column data. The information associated with the data locator may be additionally stored either in server 110 or data operator 112 or at the stage which created the data locator or in some other memory location.

The created data locator advances through one stage after the other, until the column data associated with the data locator is required by a downstream stage receiving the data locator. The downstream stage may require the associated column data to perform the read and/or write (i.e., manipulation) on the column data.

The downstream stage may be configured to retrieve the column data associated with the data locator which it received. In some embodiments, when the downstream stage receiving the data locator determines that it needs to receive the associated column data, the downstream stage is configured to read the metadata contained in the data locator. The downstream stage reads the metadata contents of the data locator thread it received to identify the upstream stage which created the data locator. The downstream stage may further be enabled to communicate with the upstream stage corresponding to the data locator. In some embodiments, the hash key may be utilized by the downstream stage to identify the stage corresponding to the associated column data, and the associated column data is fetched using the hash key information contained in the data locator.

In some embodiments, the downstream stage receiving the data locator makes a request to the corresponding upstream stage which created the data locator to transmit column data associated with the received the data locator. In some embodiments, the downstream stage makes a request to another thread, called a data provider, which is spawned in parallel by the stage that created the data locator. The downstream stage is enabled to read the metadata of the data locator so as to know the method of contacting the data provider.

A data provider is a thread or agent which is spawned simultaneously when a data locator is created by the upstream stage. A data provider assists in reading the metadata contained in the data locator. In some embodiments, the process which is configured to run the stage is additionally capable of spawning a data provider thread as part of the process to run the stage. As a result, the data provider is also configured to access the same memory as that of the stage creating the data locator or the data provider. The data provider thread is hosted by the upstream stage which created the data locator.

In some embodiments, the data provider is enabled to identify the column data associated with the data locator. The data provider is further enabled to communicate with the stage saving the column data (on which it is running) to fetch the associated column data and transmit the column data directly to the downstream stage making the request for the column data by bypassing the transfer of column data through the intervening stages. In some embodiments, the data provider is enabled to maintain the actual column data corresponding to each data locator at the stage which spawned the data provider. The data provider is configured to send the column data to the downstream stage which made the request for the column data.

The data provider may include a hash table, which may be maintained in memory, and which includes information about the identity of the stage saving the associated column data corresponding to the created data locator. A hash table in the data provider may include the common hash key which maps the column data to the created data locator and the stage saving the data. The hash key may be utilized by the data provider to retrieve the column data from the stage which is associated with the created the data locator. In some examples, the data locator may include information such as host name or port to connect to the data provider.

In some embodiments, the provision of the requested data by the downstream stage may be made available via TCP/IP, when both the downstream and the upstream stages are on different platform and don't have a common network. In one example, the data can be directly made available from the data source when the column data is not read by any intervening stages.

Once the downstream stage receives the column data, the downstream stage is configured to either read and/or write to (i.e., update) the received column data. The downstream stage is enabled to manipulate the column data. The downstream stage is configured to simultaneously create a new data locator thread to replace the modified column data. The downstream stage is further configured to create an additional data provider thread. The data provider thread created is enabled to keep running at the stage which created it. The downstream stage is also configured to save the modified (updated) column data in its memory.

In parallel, the upstream stage, after it has transmitted the column data, will delete the data provider created corresponding to the data locator. In some embodiments, the upstream stage is configured to flush, or delete, the existing column data. The upstream stage is further configured to update the information saved in its memory corresponding to the deleted column data.

In some embodiments, as a result of manipulations to the received column data, the existing data locator is flushed out by the downstream stage and a new data locator is created for the manipulated column data. In some embodiments, the created data locator, which has traversed, is deleted when a process ends the use of the data locator. Metadata values corresponding to the newly created data locator are updated such that the newly created data locator can be utilized to provide access to the latest version of the column data. All further writes to the column data are done through the updated (i.e., new) data locator. The resulting new data locator gets a new data locator variable. It is the new data locator which is transmitted to subsequent stages when the column data size is above the predetermined threshold.

In some embodiments, the saved column data may be moved to a disk storage after a predetermined time by a thread called a data flusher, which is spawned in parallel with the data locator. The data flusher may utilize information contained in the data provider to move the column data associated with the data locator to the disk storage. The data flusher is further enabled to communicate with the data provider and the data locator to update the information associated with the disk storage saving the column data. This is also done to enable better performance during the ETL operation.

In one embodiment, data information stored in a hash table is scanned by the data flusher. A determination is made by the data flusher, as to maintaining the data in the stage memory versus flushing it out to another location, such as disk storage. This comparison may be done using a timer as a threshold. If the timer is less than a threshold, or time limit, data continues to be maintained in memory and if the data exceeds the time limit, data is flushed out by the data flusher to another memory location, such as disk storage.

In some embodiments, the data locator may be stored temporarily in a memory. The storage of the data locator in temporary memory may reduce trips to the data source.

Figure 3:
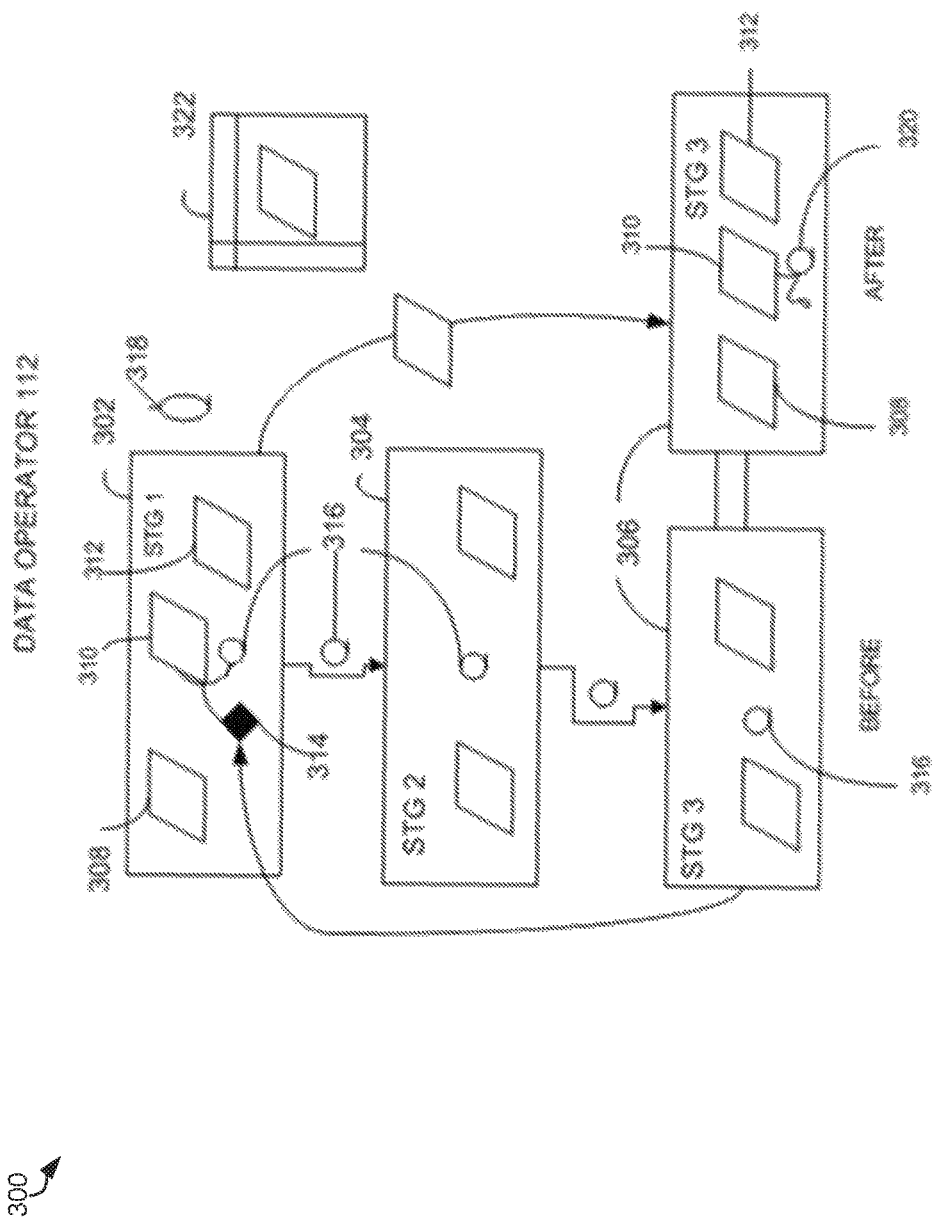
FIG. 3 illustrates an exemplary structural diagram of a data operator, depicting creation and transmission of a data locator during an ETL operation, in accordance with an embodiment of the present invention.

During the ETL process, there is a possibility that the ETL process may fail during execution of any application. This may be caused by a missing extraction from one of the systems, or missing values in reference tables, or simply a connection or power outage. Therefore, it is necessary to design the ETL process keeping failure recovery in mind. In order to overcome this, it should be possible to restart some of the phases independently from the others. For example, if the transformation step fails, it may not be necessary to restart the extract step. This can be resolved by implementing staging. FIG. 3 indicates the data locator replacing column data for transmission through subsequent stages until the data is required by the subsequent stage.

FIG. 3 depicts the creation of a data locator to replace column data for further transmission through subsequent stages. FIG. 3 shows several column data being transmitted through successive stages. FIG. 3 further illustrates the downstream stage receiving the column data directly from an upstream stream by bypassing the intervening stage.

FIG. 3 points to an example being executed by data operator 112 during the ETL operation. There are shown three stages STG 1 302, STG 2 304, and STG 3 306. Stages STG 1 302, STG 2 304, and STG 3 306 may be configured to perform a process of the ETL operation. Stages STG 1 302, STG 2 304, and STG 3 306 may include a temporary memory 322. While memory 322 is shown independent of the three respective stages, it may be located within the stages (not shown).

Corresponding to each of stages STG 1 302, STG 2 304, and STG 3 306, there are shown three column data 308, 310, and 312, respectively, being required for processing during the ETL operation. In this presentation, it can be seen that each of the column data 308, 310, and 312 may be moving one after the other from one stage to the next stage. While STG 1 302 exhibits three column data 308, 310, and 312, STG 2 304 indicates two column data 308 and 312, respectively.

As explained above, after the respective column data is determined to be of oversized LOB type, a corresponding data locator is created to replace the associated column data. From STG 1 302 it is seen that column data 308 and 312 may have been perceived as not being oversized LOB types, while column data 310 is found to be of oversized LOB type. Corresponding to the column data 310 at STG 1 302, it can be viewed that there are two threads 314 and 316 pointing from it. Thread 314, which is indicated as diamond shaped, is stipulated as launched for the data provider at stage STG 1 302 itself. Thread 316, which is indicated as round shaped, is stipulated for the creation of the data locator corresponding to the column data 310 at the stage STG 1 302 itself.

In one embodiment, when data locator thread 316 is created by STG 1 302, a data provider thread 314 is spawned at STG 1 302. Data provider thread 314 maintains the actual data for each data locator created. Data provider thread 314 is meant to send the saved associated column data to a downstream stage when it receives the request for actual column data values by the downstream stage.

It may be further noticed that during the transmission process from STG 1 302 to STG 2 304, column data 310 remains saved at STG 1 302 and other column data 308 and 312 have moved to the next stage. Further, data locator thread 316, created corresponding to the column data 310 at STG 1 302, is shown as moving towards STG 2 304 (indicated by an arrow), by replacing the column data 310. From STG 2 304, it is 2 column data 308 and 312 along with data locator thread 316 which move towards STG 3 306.

At STG 3 306, indicated by "before", it can be seen that two column data 308 and 312 along with data locator thread 316, are received. Stage STG 3 306 makes a determination as to whether it wants to read and/or modify the data associated with data locator thread 316. Stage STG 3 306 reads through the metadata information as contained in data locator thread 316 to determine if the column data content corresponding to data locator thread 316 may be required by it for data processing.

Based upon determining that the content as contained corresponding to data locator thread 316 is required by STG 3 306, stage STG 3 306 makes a request to data provider thread 314 running at STG 1 302. It sends the request to data provider thread 314, located at STG 1 302 (pointed to by an arrow). The making of request is shown by an arrow pointing from STG 3 306 towards STG 1 302. Data provider thread 314 has remained hosted at the stage that previously saved the column data.

Data provider thread 314 upon receiving the request, reads through the metadata of data locator thread 316, to identify the associated column data 310. Data provider thread 314 running at STG 1 302 responds to STG 3 306, indicated via an arrow pointed towards STG 3 306. Data provider thread 314 identifies the column data associated with the information received for data locator thread 316. Data pointer 316 sends column data 310 to STG 3 306, indicated under STG 3 306, shown as "after." It is further noticed that data provider thread 314 sends column data 310 directly to STG 3 306 by bypassing intervening stage STG 2 304. Stage STG 3 306, is shown as receiving column data 310.

Referring to the block labeled "after," STG 3 306 having read the column data 310, saves the column data and a corresponding new data locator 320 is created, after the existing data locator thread 316 is flushed out from the stage. Under stage STG 3 306 ("after"), are now indicated three column data 308, 310' and 312, respectively. It is further seen that a new data locator 320 is created at STG 3 306, corresponding to the modified column data 310'.

While, memory 322 is not shown included in either of STG1 302, STG2 304 or STG3 306, this may not be taken as limitation, as this is for the sake of convenience. Each of the stages STG 1 302, STG 2 304, and STG 3 306, may have a memory 322 of its own. The stage with which memory 322 is associated can read the data from that stage and can also modify the data.

Similarly, another thread data flusher 318 is illustrated. The location of data flusher 318 may be in the respective stage which created the data locator. In some embodiments, data flusher 118 may be part of memory 122. The function of data flusher 318 is to ensure a timely move of the saved column data from the stage to another location on the disk. Data flusher 118 may be further configured to communicate with the data provider and the data locator of the stage to update the new location of the saved column data.

The above embodiments and implementations may combine together and cross-reference, thereby resulting in more embodiments.

Figure 4:
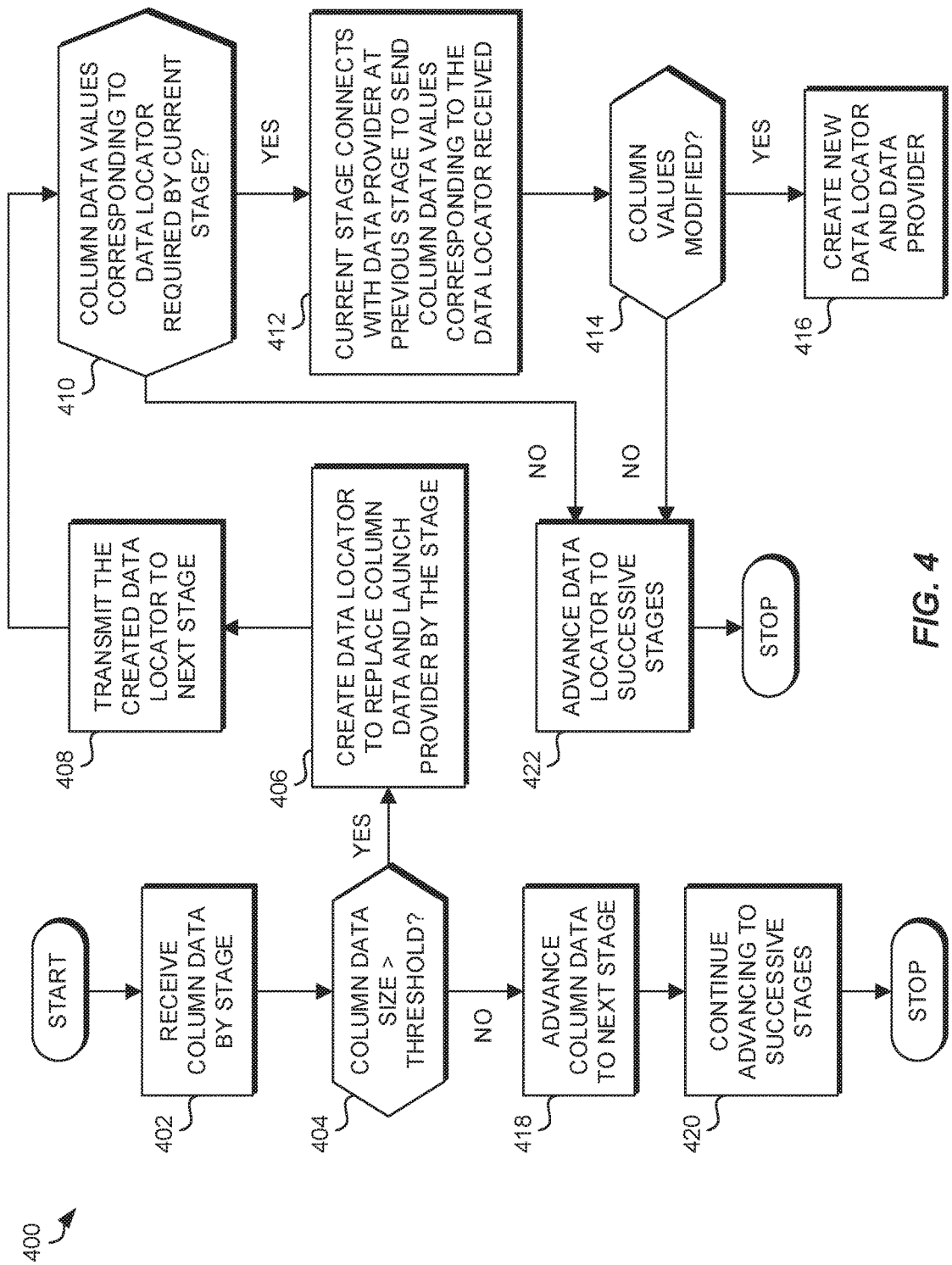
FIG. 4 illustrates an example process involving the lifecycle of a data locator during an ETL operation, in accordance with an embodiment of the present invention.

FIG. 4 illustrates an example process 400 depicting the lifecycle of a data locator during an ETL operation, according to one embodiment. Process 400 comprises:

Step 402: A stage receives column data. The stage may receive column data from either a database source, or through an intermediate source, or from any upstream stage.

Step 404: The size of the received column data is determined. If the size of the received column data is above a predefined threshold, move to step 406, else move to step 418.

Step 406: The stage that determines that the size of the received column data is above the threshold creates a data locator to replace the received column data. The stage simultaneously spawns a data provider. The stage further saves the column data in its memory.

Step 408: The stage that created the data locator advances the data locator to the next stage. The data locator keeps advancing until the associated column data corresponding to the received data locator is required by a downstream stage.

Step 410: The stage that subsequently received the data locator determines whether the associated column data is required by it for either reading or writing. If the stage determines that the associated column data is required by it for either reading or writing, it moves to step 412, and if the stage determines that the associated column data is not required, the stage advances the data locator for further processing at step 422.

Step 412: The stage reads the metadata content of the received data locator. It identifies the data provider and the stage saving the column data. The stage then makes a request to the data provider to send the associated column data to it for manipulating the column data directly by bypassing the intermediate stages.

Step 414: A determination is made whether the column data values are modified. If modified move to step 416, else move to step 422.

Step 416: After the determination that the current stage has modified the column data, the stage creates a new data locator for onward transmission through subsequent stages. The stage also spawns a new data provider.

Step 418: When it is determined by the stage that the size of received column data does not exceed the threshold, the stage advances the column data to the next stage.

Step 420: Subsequent stages may either read or write to the received column data and subsequently also continue advancing the modified data to subsequent stages.

Step 422: Once it is determined, by the stage receiving the data locator, that the column data associated with the data locator is not required by the subsequent stage, the stage advances the data locator to following stages, until required.

The various embodiments implementing the method have been described with respect to the accompanying drawings. Those skilled in the art may understand that the method may be implemented in software, hardware or combinations of software and hardware. Moreover, those skilled in art may understand that by implementing various steps of the above method in software, hardware or combinations of software and hardware, there may be provided an environment 10 in which example embodiments of the inventive subject matter may be practiced as shown.

Figure 5:
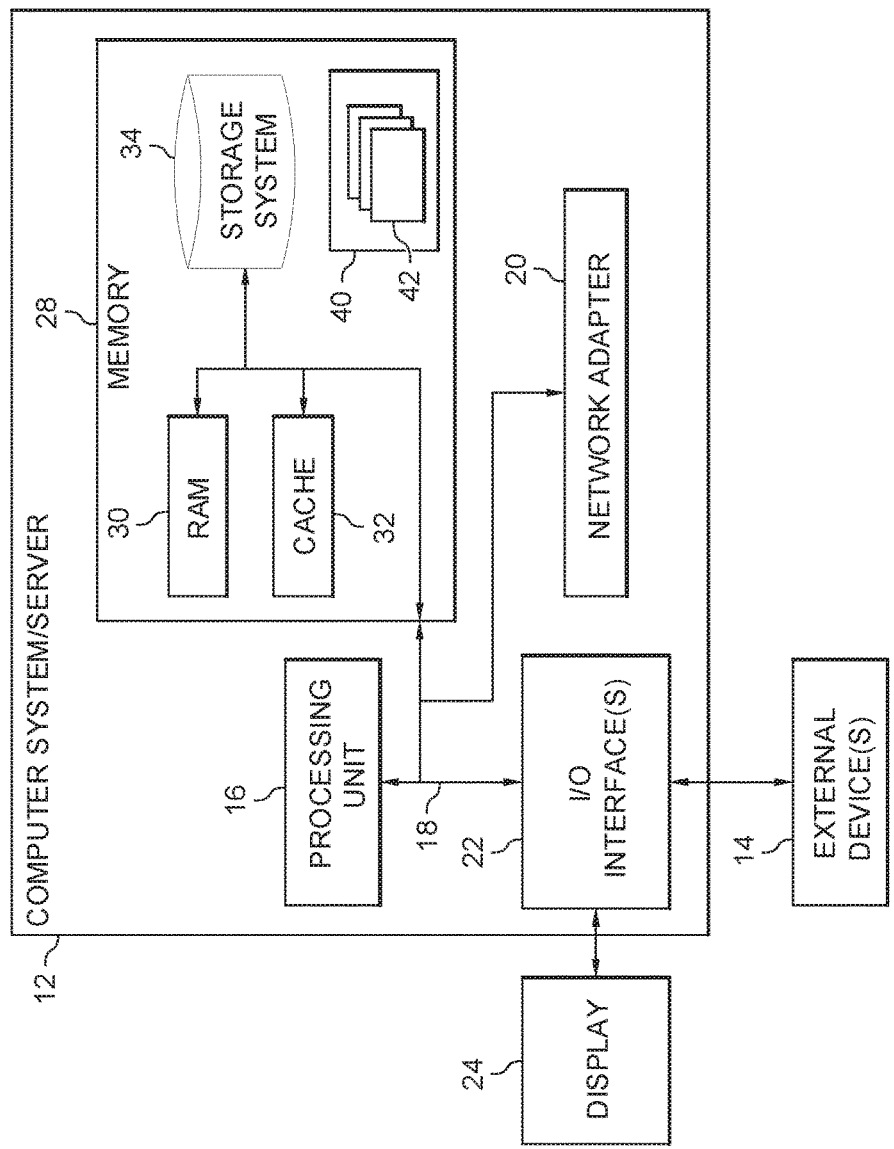
FIG. 5 illustrates a block diagram of an exemplary computer system/server, which is applicable to implement embodiments of the present invention.

Referring now to FIG. 5, in which a block diagram of an exemplary computer system/server 12 which is applicable to implement the embodiments of the present invention is shown. Computer system/server 12 shown in FIG. 5 is only illustrative and is not intended to suggest any limitation as to the scope of use or functionality of embodiments of the invention described herein.

As shown in FIG. 5, computer system/server 12 is shown in the form of a general-purpose computing device. The components of computer system/server 12 may include, but are not limited to, one or more processors or processing units 16, a system memory 28, and a bus 18 that couples various system components including the system memory 28 and the processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an internet service provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer program product comprising one or more computer-readable tangible storage media and program instructions stored on at least one of the one or more computer-readable tangible storage media, the program instructions executable by a processor to cause the processor to perform a method of shipping data between stages of an extract, transform, and load (ETL) process, wherein the method comprising:

receiving, by a stage of a plurality of stages associated with the ETL process, column data;

ascertaining, by the stage, a size of the received column data; and in response to determining, by the stage, that the size of the received column data exceeds a predefined threshold:

saving, by the stage, the column data;

creating, by the stage, a data locator associated with the column data, wherein the created data locator is a data structure that includes metadata comprising (i) a hash key, (ii) a source indicator, and (iii) a timestamp, wherein the hash key corresponds to the saved column data associated with the data locator, the source indicator corresponds to the stage, and the timestamp indicates when the column data was received in the stage, advancing the created data locator through each of a plurality of successive downstream stages;

receiving, at the stage, an indication that a respective downstream stage requires the column data based on the data locator received at the respective downstream stage;

determining, by the respective successive stage and based on the received data locator, whether the saved column data is a latest version;

in response to determining that the saved column data is the latest version, forwarding the saved column data directly from the stage to the respective downstream stage; and in response to determining that the saved column data is not the latest version, forwarding the latest version of the column data directly to the respective downstream stage from an upstream stage, different than the stage, containing the latest version of the column data.

* * * * *